(No Model.)
E. J. MILES.
WAGON BRAKE LEVER.
No. 295,190. Patented Mar. 18, 1884.
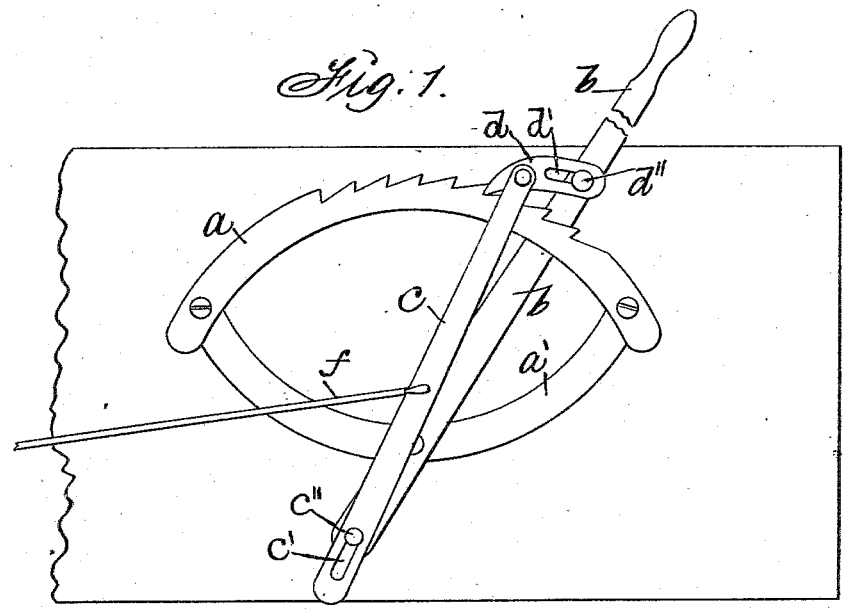
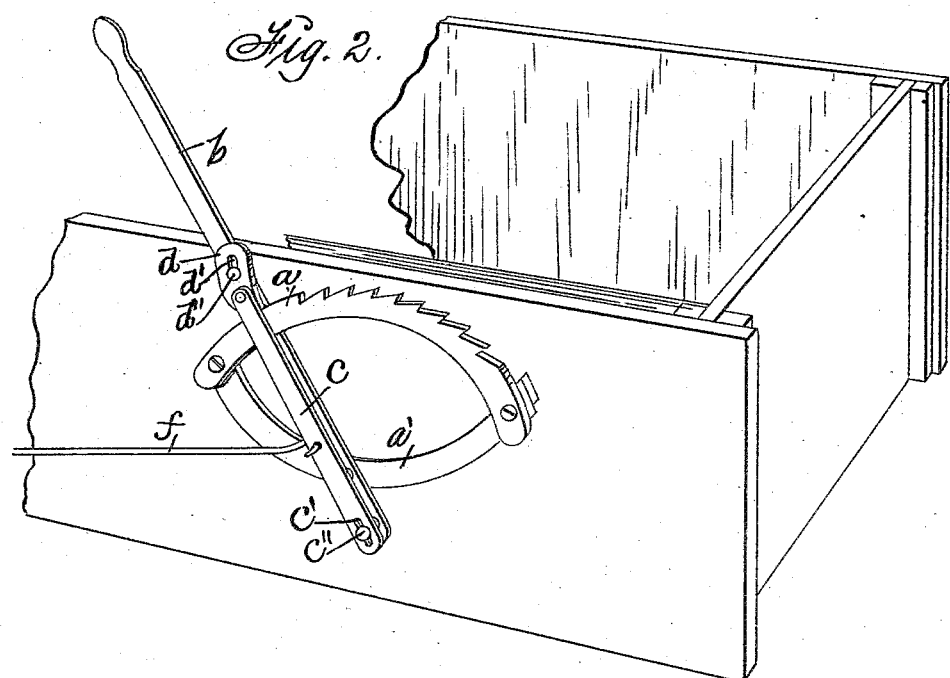
Witnesses:
James H. Coon,
Winfield Fielden,
Inventor:
Edward J. Miles,
By Thomas G. Orwig, Atty.

UNITED STATES PATENT OFFICE.

EDWARD J. MILES, OF KELLOGG, IOWA, ASSIGNOR OF ONE-HALF TO H. M. COX, OF SAME PLACE.

WAGON-BRAKE LEVER.

SPECIFICATION forming part of Letters Patent No. 295,190, dated March 18, 1884.

Application filed November 24, 1883. (No model.)

*To all whom it may concern:*

Be it known that I, EDWARD J. MILES, of Kellogg, in the county of Jasper and State of Iowa, have invented an Improvement in Wagon-Brakes, of which the following is a specification.

My invention consists in the construction and combination of a compound lever and lever-locking device, as hereinafter fully set forth, in such manner that less force will be required to apply the brake-shoes to lock the wheels of a vehicle, no attention whatever being required from the operator in locking the lever and retaining the brake-shoes upon the wheels; simply a reverse motion made with the lever unlocks it and frees the brake from the wheels.

Figure 1 of my accompanying drawings is a side view, showing my improved wagon-brake lever and automatic lever-locking device applied to a wagon-box, the lever in a locked position. Fig. 2 is a perspective view, showing the lever in an unlocked position. Together these figures clearly illustrate the construction, application, and operation of my complete invention.

$a$ represents a segmental frame, adapted to have its ends fixed against the outside of a wagon-box in such a manner that a lever can be extended and operated between the frame and the box. A series of ratchet-teeth are formed in the upper or outer edge and in an arc of the frame.

$b$ is a hand-lever of the first order, pivoted to the wagon-box in such a manner that the pivot or fulcrum will be in a concentric position relative to the ratchet-face arc of the frame $a$.

$a'$ represents a curved bar or plate that may be formed integral with the frame $a$ by casting in a mold, or formed separately and combined therewith by means of rivets or bolts, or in any suitable way.

$c$ is a lever of the second order, that has a slot or bridle, $c'$, at its lower end, through which slot a stud, $c''$, extends from the lower end and short arm of the lever $b$, to form a sliding connection between the two levers.

$d$ is a pawl, flexibly connected with the long arms of the two levers $b$ and $c$, to serve as a link between the two levers, and also to perform the function of a pawl in automatically locking and unlocking the complete compound lever, as required in operating a wagon-brake.

$d'$ is a slot in the pawl $d$, through which a stud, $d''$, extends from the long arm of the lever $b$.

$f$ is a rod, flexibly connected with the central portion of the lever $c$, to extend therefrom to the brake mechanism at the rear portion of the wagon.

Pulling forward the top end and long arm of the lever $b$, as required to throw the brake-shoes or friction-plates against the peripheries of the wheels, causes the stud $d''$ in the slot or bridle $d'$ of the pawl and link $d$ to assume a horizontal position, as shown in Fig. 1, and to engage the ratchet-teeth of the frame $a$, and to thereby lock the lever fast to the frame, and the brake-shoes to the wheels. The power applied by the hand of the operator to the top of the lever $b$ is transmitted and augmented by the lever $c$ to the rod $f$, and from thence to the brake devices and wheels. A reverse motion of the lever $b$ will cause the pawl and link $d$ to assume a vertical position and the lever $c$ to rise, as shown in Fig. 2, and as required to unlock the compound lever and release the brake-shoes from the wheels.

I claim as my invention—

The improved wagon-brake lever and automatic lever-locking device, composed of a frame having ratchet-teeth in an arc and section of its edge, a lever of the first order, a lever of the second order, having a sliding connection with the short arm of the lever of the first order, a combined pawl, link, or bridle flexibly connected with the long arms of the two levers, and a rod connected with the central portion of the lever of the second order, to operate in the manner set forth.

EDWARD J. MILES.

Witnesses:
  M. I. COOPER,
  T. C. S. COOPER.